US012643976B2

(12) United States Patent
Zorn et al.

(10) Patent No.: US 12,643,976 B2
(45) Date of Patent: Jun. 2, 2026

(54) ISOCYANATE-TERMINATED PREPOLYMERS BASED ON POLYOXYMETHYLENE-POLYOXYALKYLENE BLOCK COPOLYMERS, PROCESS FOR THE PREPARATION AND USE THEREOF

(71) Applicant: Power2Polymers GmbH, Aachen (DE)

(72) Inventors: Anna-Marie Zorn, Ettlingen (DE); Christoph Thiebes, Cologne (DE); Beate Baumbach, Burscheid (DE); Annika Hill, Cologne (DE); Michael Weinkraut, Langenfeld (DE); Mike Schuetze, Leverkusen (DE)

(73) Assignee: Power2Polymers GmbH, Aachen (DE)

( * ) Notice: Subject to any disclaimer, the term of this patent is extended or adjusted under 35 U.S.C. 154(b) by 559 days.

(21) Appl. No.: 18/042,800

(22) PCT Filed: Aug. 30, 2021

(86) PCT No.: PCT/EP2021/073822

§ 371 (c)(1),
(2) Date: Feb. 24, 2023

(87) PCT Pub. No.: WO2022/049012

PCT Pub. Date: Mar. 10, 2022

(65) Prior Publication Data

US 2023/0235110 A1 Jul. 27, 2023

(30) Foreign Application Priority Data

Sep. 1, 2020 (EP) .................................... 20193788

(51) Int. Cl.

| | |
|---|---|
| ***C08G 18/10*** | (2006.01) |
| ***C08G 18/30*** | (2006.01) |
| ***C08G 18/48*** | (2006.01) |
| ***C08G 18/50*** | (2006.01) |
| ***C08G 18/56*** | (2006.01) |
| ***C08G 18/76*** | (2006.01) |
| ***C08L 59/04*** | (2006.01) |
| ***C09J 175/08*** | (2006.01) |

(52) U.S. Cl.

CPC ........... *C08G 18/10* (2013.01); *C08G 18/307* (2013.01); *C08G 18/5021* (2013.01); *C09J 175/08* (2013.01); *C08G 2150/00* (2013.01); *C08G 2170/00* (2013.01); *C08G 2190/00* (2013.01)

(58) Field of Classification Search

None

See application file for complete search history.

(56) References Cited

U.S. PATENT DOCUMENTS

| | | | |
|---|---|---|---|
| 3,404,109 | A | 10/1968 | Milgrom |
| 3,436,375 | A | 4/1969 | Francis |
| 3,829,505 | A | 8/1974 | Johnston |
| 3,941,849 | A | 3/1976 | Herold |
| 3,996,223 | A | 12/1976 | Gupta et al. |
| 4,255,569 | A | 3/1981 | Mueller et al. |
| 4,355,188 | A | 10/1982 | Herold et al. |
| 4,380,620 | A | 4/1983 | Matsuzaki et al. |
| 4,721,818 | A | 1/1988 | Harper et al. |
| 4,837,359 | A | 6/1989 | Woynar et al. |
| 4,877,906 | A | 10/1989 | Harper |
| 4,960,848 | A | 10/1990 | Scholl et al. |
| 4,987,271 | A | 1/1991 | Natabe et al. |
| 4,994,541 | A | 2/1991 | Dell et al. |
| 5,010,047 | A | 4/1991 | Schuchardt |
| 5,064,960 | A | 11/1991 | Pedain et al. |
| 5,076,958 | A | 12/1991 | Pedain et al. |
| 5,099,075 | A | 3/1992 | Katz et al. |
| 5,158,922 | A | 10/1992 | Hinney et al. |
| 5,391,722 | A | 2/1995 | Chandalia et al. |
| 5,470,813 | A | 11/1995 | Le-Khac |
| 5,482,908 | A | 1/1996 | Le-Khac |
| 5,536,883 | A | 7/1996 | Le-Khac |
| 5,545,601 | A | 8/1996 | Le-Khac |
| 5,627,120 | A | 5/1997 | Le-Khac |
| 5,637,673 | A | 6/1997 | Le-Khac |
| 5,712,216 | A | 1/1998 | Le-Khac et al. |
| 5,714,428 | A | 2/1998 | Le-Khac |
| 5,789,626 | A | 8/1998 | Le-Khac |
| 5,914,383 | A | 6/1999 | Richter et al. |
| 6,018,017 | A | 1/2000 | Le-Khac |
| 6,835,687 | B2 | 12/2004 | Hofmann et al. |
| 7,008,900 | B1 | 3/2006 | Hofmann et al. |
| 7,253,244 | B2 | 8/2007 | Gruenewaelder et al. |
| 7,985,479 | B2 | 7/2011 | Wamprecht et al. |

(Continued)

FOREIGN PATENT DOCUMENTS

| | | |
|---|---|---|
| DE | 2414413 A1 | 10/1975 |
| EP | 0406440 A1 | 1/1991 |

(Continued)

OTHER PUBLICATIONS

Laas, H.J. et al., J. Prakt. Chem., 336 (1994), pp. 185-200.

(Continued)

*Primary Examiner* — Melissa A Rioja
(74) *Attorney, Agent, or Firm* — Foley & Lardner LLP

(57) ABSTRACT

The present invention relates to isocyanate-terminated prepolymers based on polyoxymethylene-polyoxyalkylene block copolymers, to a process for their preparation, and to the use of these isocyanate-terminated prepolymers as isocyanate components in 1- and 2-component systems for coatings, adhesives and sealants.

17 Claims, No Drawings

(56) References Cited

U.S. PATENT DOCUMENTS

| | | | | |
|---|---|---|---|---|
| 9,534,090 | B2 | 1/2017 | Mueller et al. | |
| 11,001,666 | B2 * | 5/2021 | Albach | C08G 18/725 |
| 2021/0024679 | A1 | 1/2021 | Beuck et al. | |
| 2021/0395430 | A1 * | 12/2021 | Langanke | C08G 18/73 |
| 2022/0106431 | A1 * | 4/2022 | Marbach | C08G 18/089 |

FOREIGN PATENT DOCUMENTS

| | | | |
|---|---|---|---|
| GB | 1145952 | A | 3/1969 |
| GB | 1244416 | A | 9/1971 |
| JP | H03263454 | A | 11/1991 |
| WO | 2004096746 | A1 | 11/2004 |
| WO | 2014048941 | A1 | 4/2014 |

OTHER PUBLICATIONS

Haubs, M. et al., 2012, Polyoxymethylenes, Ullmann's Encyclopedia of Industrial Chemistry.
Reuss, G. et al., 2012, Formaldehyde, Ullmann's Encyclopedia of Industrial Chemistry.
Matsuzaki, K. et al., Bull. Chem. Soc. J., 1994, 67, pp. 2560-2566.
International Search Report, PCT/EP2021/073822, date of mailing: Jan. 25, 2022, Authorized officer: Martin Bergmeier.

* cited by examiner

ISOCYANATE-TERMINATED PREPOLYMERS BASED ON POLYOXYMETHYLENE-POLYOXYALKYLENE BLOCK COPOLYMERS, PROCESS FOR THE PREPARATION AND USE THEREOF

CROSS-REFERENCE TO RELATED APPLICATION

This application is a national stage application under 35 U.S.C. § 371 of PCT/EP2021/073822, filed Aug. 30, 2021, which claims the benefit of European Application No. 20193788.5, filed Sep. 1, 2020, each of which is incorporated herein by reference.

FIELD

The present invention relates to isocyanate-terminated prepolymers based on polyoxymethylene-polyoxyalkylene block copolymers and to a process for preparation thereof. The present invention further relates to the use of these isocyanate-terminated prepolymers as an isocyanate component in 1- and 2-component systems for paints, adhesives and sealants.

BACKGROUND

Isocyanate-terminated prepolymers are used in many technical fields, in particular for adhesive bonding and coating of substrates and in sealants. Both moisture-curable 1-component systems and also 2-component systems are used, wherein polyols and/or polyamines are often employed as coreactants for the isocyanate-terminated prepolymers.

There is a need in the field of moisture-curable adhesives to provide more sustainable isocyanate-terminated prepolymers that do not require acid stabilization. To be suitable for use in the field of adhesives, the isocyanate-terminated prepolymers require elevated adhesive strength and thus a high reactivity to atmospheric humidity. This is especially important to achieve the fastest possible, most complete possible conversion of the free isocyanate groups to rapidly achieve the final performance characteristics. The isocyanate-terminated prepolymer must nevertheless exhibit very good storage stability.

The prior art discloses various prepolymers for polyurethane synthesis.

WO 2014/095679 discloses NCO-modified polyoxymethylene block copolymers and the use thereof as prepolymer for preparation of flexible polyurethane foams and thermoplastic polyurethanes. The document discloses that the viscosity of the prepolymer can be controlled via the length of the polyoxymethylene blocks relative to the additional oligomers. The document is not concerned with the storage stability of the prepolymer.

WO 2004/096746 A1 experimentally describes isocyanate-reactive diols having OH numbers of 685 to 868 mg KOH/g based on polyoxymethylene (POM) and the document generally states that these could be suitable for preparing prepolymers. However, a specific composition or a working example were not described.

International patent application PCT/EP2019/057066 which was not yet published on the date of filing of the patent application for the present invention describes a process for preparing a prepolymer for preparation of an integral polyurethane foam, wherein the composition for preparation of the prepolymer contains an acid, and the prepolymer obtained by the process and an integral polyurethane foam based on the prepolymer.

DE-A 10 237 649 describes a 1K polyurethane adhesive containing at least one polyisocyanate prepolymer and at least one amino polyether polyol, wherein the molar ratio of ether groups to amine nitrogen in the amino polyether polyol is 7 to 30. The proportion of amino polyether polyols in the adhesive according to the invention is very low at only 0.2% to 4.0% by weight. Under dimorpholinodiethyl ether catalysis even this small proportion halves the pressing time in the adhesive bonding of beechwood. However, the open assembly time (i.e. the working time) is also markedly adversely affected even by this small amount of amino polyether.

WO 2009/000405 A1 describes moisture-curable adhesives based on isocyanate prepolymers which are obtainable from the reaction of special polyisocyanate mixtures based on 2,2'-, 2,4'- and 4,4'-MDI with amino-free and amino-containing polyethers. The adhesives exhibit good storage stability, a rather fast film-forming and short film-drying time and rather good initial and final strength.

It is an object of the present invention to provide 1- and 2-component paint, adhesive and sealant systems which exhibit faster drying than known systems of the prior art. The adhesive systems should additionally exhibit an improved adhesive strength compared to the known systems with a faster film-forming time and shorter film-drying time, a higher starting strength after a short bonding time and a higher final strength after the shortest possible curing time, and a high storage stability comparable with the known systems.

DETAILED DESCRIPTION

It has now been found that paint, adhesive and sealant systems based on special isocyanate-terminated prepolymers containing polyoxymethylene-polyoxyalkylene block copolymers as synthesis components exhibit these properties.

The present invention therefore provides a process for preparing isocyanate-terminated prepolymer for use as an isocyanate component in 1- and 2-component paint, adhesive and sealant systems comprising or consisting of reacting A. at least one aliphatic, cycloaliphatic, araliphatic and/or aromatic polyisocyanate, wherein component A has an NCO content according to DIN EN ISO 11909:2007-05 of 15% to 60% by weight, preferably 15% to 50% by weight, particularly preferably 15% to 45% by weight, B. at least one polyoxymethylene-polyoxyalkylene block copolymer having a hydroxyl number according to DIN 53240-2:2007-11 of 15 mg KOH/g to 200 mg KOH/g, C. i) at least one amino-containing polyether based on propylene oxide having a hydroxyl number according to DIN 53240-2:2007-11 of 40 to 80 mg KOH/g, an OH functionality of 4.0 and an amine content according to DIN EN 9702:1998 in the range from 0.5% to 1.0% by weight, ii) optionally at least one amino-containing polyether based on based on ethylene oxide, propylene oxide or a mixture of ethylene oxide and propylene oxide having an $NH_2$-functionality of 2 or 3, with the exception of amino-containing polyethers of component Ci, D. optionally auxiliaries containing protic acids (D2) and/or auxiliaries which are not protic acids of D2 (D1).

The inventive isocyanate-terminated prepolymers based on polyoxymethylene-polyoxyalkylene block copolymers are more cost-effective than isocyanate prepolymers synthesized from standard building blocks in PU applications. Their carbon footprint is also smaller, thus making it possible to provide more environmentally friendly building blocks for the PU market.

A high storage stability is understood to mean that the dynamic viscosity of the isocyanate-terminated prepolymer increases by not more than 55% after storage for six months at 25° C. under a protective gas atmosphere. These storage conditions are simulated by storing a sample at 70° C. over a period of 14 days under a nitrogen atmosphere. In addition, the NCO content of the isocyanate-terminated prepolymer during storage under the abovementioned conditions should fall by not more than 10%, thus ensuring that the reactivity of the isocyanate-terminated prepolymer is sufficiently high to ensure good adhesive strength even after storage.

Starting compounds A for the process according to the invention are any desired polyisocyanates having aliphatically, cycloaliphatically, araliphatically and/or aromatically bonded isocyanate groups. The polyisocyanates have an isocyanate functionality ≥2.

Suitable polyisocyanates A are any desired diisocyanates obtainable in various ways, for example by phosgenation in the liquid or gas phase or by a phosgene-free route, for example by thermal urethane cleavage. Preferred diisocyanates are those in the molecular weight range of 140 to 400 having aliphatically, cycloaliphatically, araliphatically and/or aromatically bonded isocyanate groups, for example 1,4-diisocyanatobutane, 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)isocyanatomethylcyclohexane, bis(isocyanatomethyl)norbornane, 1,3- and 1,4-bis(2-isocyanatoprop-2-yl)benzene (TMXDI), 1,5-diisocyanatonaphthalene (NDI), norbornane diisocyanate (NBDI), 2,4- and 2,6-diisocyanatotoluene (TDI) and 2,2'-, 2,4'- and 4,4'-diisocyanatodiphenylmethane (MDI). It is also possible to use poly(methylene phenyl isocyanate) (pMDI, polymeric MDI, crude MDI). The polyisocyanates mentioned may also be used in admixture with one another.

Suitable polyisocyanates A further include any desired polyisocyanates having a uretdione, isocyanurate, allophanate, biuret, iminooxadiazinedione and/or oxadiazinetrione structure prepared by modification of simple aliphatic, cycloaliphatic, araliphatic and/or aromatic diisocyanates, for example those of the abovementioned type, such as are as described for example in J. Prakt. Chem. 336 (1994) 185-200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299 or any desired mixtures of such polyisocyanates.

In the preparation of these polyisocyanates, the actual modification reaction is generally followed by a further process step for removing the unreacted excess monomeric diisocyanates. This removal of monomers is effected by processes known per se, preferably by thin-film distillation under reduced pressure or by extraction with suitable solvents inert toward isocyanate groups, for example aliphatic or cycloaliphatic hydrocarbons such as pentane, hexane, heptane, cyclopentane or cyclohexane. The process according to the invention preferably employs modified polyisocyanates of the abovementioned type that have a content of monomeric diisocyanates of less than 1% by weight, preferably less than 0.5% by weight, particularly preferably of less than 0.3% by weight.

Preferred polyisocyanates A for the process according to the invention are the abovementioned polyisocyanate having exclusively aromatically bonded isocyanate groups.

Particular preference is given to aromatic polyisocyanates such as for example 1,5-naphthalene diisocyanate (NDI), diisocyanatodiphenylmethane (2,2'-, 2,4'- and 4,4'-MDI), especially the 2,4'- and 4,4'-isomers and technical mixtures of these two isomers or technical mixtures of the three MDI isomers, poly(methylene phenyl isocyanate) (pMDI, polymeric MDI, crude MDI), diisocyanatomethylbenzene (2,4- and 2,6-tolylene diisocyanate, TDI), especially the 2,4- and 2,6-isomers and technical mixtures of the two isomers.

A very particularly suitable aromatic polyisocyanate is 2,4-tolylene diisocyanate and the technical mixture thereof consisting of 70 to 90% of 2,4-tolylene diisocyanate and 30 to 10% of 2,6-tolylene diisocyanate.

Also very particularly suitable is a polyisocyanate mixture based on diphenylmethane diisocyanate having a proportion of 4,4'-isomers of <50%, preferably <48%, particularly preferably <46% and very particularly preferably <44%; a proportion of 2,4'-isomers in the range from 10% to 15%, particularly preferably 11% to 14% and particularly preferably 11.5% to 13.5%; and a proportion of 2,2'-isomers in the range from 0.1% to 5%, preferably 1% to 4% and particularly preferably 1.5% to 3.5%; an isocyanate content between 30% and 33% by weight, particularly preferably 31% and 32% by weight; and an average functionality >2.0, preferably >2.2, particularly preferably >2.4 and very particularly preferably >2.5.

The composition for preparing the isocyanate-terminated prepolymer preferably contains 50% by weight to 70% by weight of component A based on the sum of all components in the composition.

Component B to be employed in the process according to the invention is selected from polyoxymethylene-polyoxyalkylene block copolymers having a hydroxyl number to DIN 53240-2 (November 2007) of 15 mg KOH/g to 200 mg KOH/g, preferably of 30 mg KOH/g to 150 mg KOH/g, more preferably of 40 mg KOH/g to 100 mg KOH/g. The composition for preparing the isocyanate-terminated prepolymer preferably contains 15% by weight to 30% by weight of component B based on the sum of all components in the composition. Polyoxymethylene-polyoxyalkylene block copolymers in the context of the invention refer to polymeric compounds which contain at least one polyoxymethylene block and at least one additional polyoxyalkylene or polyoxyalkylene carbonate block and preferably do not exceed a molecular weight in the four-digit range.

It is preferable to prepare component B by catalytic addition of alkylene oxides and optionally further comonomers onto at least one polymeric formaldehyde starter compound having at least one terminal hydroxyl group in the presence of a double metal cyanide (DMC) catalyst, wherein (i) in a first step the DMC catalyst is activated in the presence of the polymeric formaldehyde starter compound at an activation temperature (Tact) of 20 to 120° C., wherein the DMC catalyst is activated by adding a portion (based on the total amount of the amount of alkylene oxides used in the activation and polymerization) of one or more alkylene oxides ("activation"), (ii) in a second step one or more alkylene oxides and optionally further comonomers are added to the mixture that results from step (i), wherein the alkylene oxides used in step (ii) are different than the alkylene oxides used in step (i) ("polymerization").

Suitable polymeric formaldehyde starter compounds are in principle those oligomeric and polymeric forms of formaldehyde that have at least one terminal hydroxyl group for reaction with the alkylene oxides and any further comonomers. The term "terminal hydroxyl group" is to be understood as meaning in particular a terminal hemiacetal functionality which is formed as a structural feature by the polymerization of formaldehyde. For example, the starter compounds may be oligomers and polymers of formaldehyde of the general formula HO $(CH_2O)n$-H where n is an integer ≥2 and where polymeric formaldehyde typically has n>8 repeat units.

Preferred polymeric formaldehyde starter compounds generally have molar masses of 62 to 30 000 g/mol, preferably of 62 to 12 000 g/mol, more preferably of 242 to 6000 g/mol and most preferably of 242 to 3000 g/mol, and comprise from 2 to 1000, preferably from 2 to 400, more preferably from 8 to 200 and most preferably from 8 to 100 repeat oxymethylene units. The starter compounds used typically have a functionality (F) of 1 to 3, but in certain cases may also have higher functionality, i.e. have a functionality of >3. It is preferable to use open-chain polymeric formaldehyde starter compounds having terminal hydroxyl groups and having a functionality of 1 to 10, preferably of 1 to 5, more preferably of 2 to 3. It is most preferable to use linear polymeric formaldehyde starter compounds having a functionality of 2. The functionality F corresponds to the number of OH end groups per molecule.

The polymeric formaldehyde starter compounds that are used for the process for preparing component B can be prepared by known processes (cf, for example, M. Haubs et al., 2012, Polyoxymethylenes, Ullmann's Encyclopedia of Industrial Chemistry; G. Reus et al., 2012, Formaldehyde, ibid.). The formaldehyde starter compounds can in principle also be used in the form of a copolymer, in which case comonomers incorporated in the polymer in addition to formaldehyde are, for example, 1,4-dioxane or 1,3-dioxolane. Further suitable formaldehyde copolymers are copolymers of formaldehyde and of trioxane with cyclic and/or linear formals, for example butanediol formal, or epoxides. It is likewise conceivable for higher homologous aldehydes, for example acetaldehyde, propionaldehyde, etc., to be incorporated into the formaldehyde polymer as comonomers. It is likewise conceivable for formaldehyde starter compounds in turn to be prepared from H-functional starter compounds; the use of polyfunctional starter compounds in particular makes it possible to obtain polymeric formaldehyde starter compounds having a hydroxyl end group functionality F>2 (cf, for example, WO 1981001712 A1, Bull. Chem. Soc. J., 1994, 67, 2560-2566, U.S. Pat. No. 3,436,375, JP 03263454, JP 2928823).

Also usable for the process for preparing component B are mixtures of different polymeric formaldehyde starter compounds or mixtures with other H-functional starter compounds. Suitable H-functional starter substances ("starters") employed may be compounds having alkoxylation-active hydrogen atoms and having a molar mass of 18 to 4500 g/mol, preferably of 62 to 2500 g/mol and more preferably of 62 to 1000 g/mol. Alkoxylation-active groups having active hydrogen atoms are, for example, —OH, —NH2 (primary amines), —NH— (secondary amines), —SH, and —CO2H, preference being given to —OH and —NH2, particular preference to —OH. H-Functional starter substances used are, for example, one or more compounds selected from the group consisting of mono- and polyhydric alcohols, polyfunctional amines, polyfunctional thiols, amino alcohols, thio alcohols, hydroxy esters, polyether polyols, polyester polyols, polyester ether polyols, polyethercarbonate polyols, polycarbonate polyols, polycarbonates, polyethyleneimines, polyetheramines, polytetrahydrofurans (e.g. PolyTHF® from BASF), polytetrahydrofuran amines, polyether thiols, polyacrylate polyols, castor oil, the mono- or diglyceride of ricinoleic acid, monoglycerides of fatty acids, chemically modified mono-, di- and/or triglycerides of fatty acids, and C1-C24 alkyl fatty acid esters containing an average of at least 2 OH groups per molecule.

As is well known, formaldehyde requires only the presence of small traces of water to polymerize. In aqueous solution, therefore, depending on the concentration and temperature of the solution, a mixture of oligomers and polymers of different chain lengths is formed, in equilibrium with molecular formaldehyde and formaldehyde hydrate. So-called paraformaldehyde precipitates out of the solution here as a white, sparingly soluble solid, and is generally a mixture of linear formaldehyde polymers where n=8 to 100 repeat oxymethylene units.

In one embodiment, polymeric formaldehyde, i.e. what is called paraformaldehyde, which is commercially available at low cost, is used directly as the starter compound. It is possible in particular via the molecular weight and the end group functionality of the polymeric formaldehyde starter compound to introduce polyoxymethylene blocks of defined molar weight and functionality into the product.

In the process for preparing component B the length of the polyoxymethylene block may advantageously be controlled in simple fashion via the molecular weight of the employed formaldehyde starter compound. Preference is given here to using linear formaldehyde starter compounds of the general formula HO—$(CH_2O)n$-H where n is an integer ≥2, preferably with n=2 to 1000, more preferably with n=2 to 400 and most preferably with n=8 to 100, having two terminal hydroxyl groups. Starter compounds used may in particular also be mixtures of polymeric formaldehyde compounds of the formula HO—$(CH_2O)n$-H that each have different values of n. In a preferred embodiment, the employed mixtures of polymeric formaldehyde starter compounds of the formula HO—$(CH_2O)n$-H contain at least 1% by weight, preferably at least 5% by weight and more preferably at least 10% by weight of polymeric formaldehyde compounds with n≥20.

The process for preparing component B especially makes it possible to obtain polyoxymethylene block copolymers having an A-B-A block structure comprising an inner polyoxymethylene block (B) and outer oligomeric blocks (A). It is likewise possible to use formaldehyde starter compounds having a hydroxyl end group functionality F>2, by means of which it is consequently possible to prepare homologous block structures B(-A)y having a number y>2 of outer oligomeric blocks (A) that results in accordance with the functionality of the formaldehyde starter compound used. It is likewise possible in principle to use formaldehyde starter compounds having a functionality F<2; these may, for example, also be linear formaldehyde starter compounds with F=1 that are substituted at one end of the chain by a protecting group or by other chemical radicals.

Component B preferably consists of a polyoxymethylene-polypropylene oxide block copolymer or a polyoxymethylene-polyoxyalkylene carbonate block copolymer, wherein the block copolymer preferably comprises two terminal polyoxyalkylene blocks.

The outer oligomeric blocks (A) are preferably polyoxyalkylene or polyoxyalkylene carbonate blocks, where polyoxyalkylene or polyoxyalkylene carbonate blocks in the context of the invention are also understood to mean blocks incorporating (small) proportions of further comonomers, generally of less than 50 mol %, preferably less than 25 mol %, based on the total amount of all the repeat units present in the oligomeric block.

A polyoxyalkylene carbonate block in the context of the invention refers to a polymeric structural unit $O[(C_2R^1R^2R^3R^4O)_x(CO_2)(C_2R^1R^2R^3R^4O)_y]_z$— where x≥1, y≥0 and z≥1, wherein $R^1$, $R^2$, $R^3$ and $R^4$ may independently be hydrogen, an alkyl or aryl radical optionally containing additional heteroatoms such as nitrogen, oxygen, silicon, sulfur or phosphorus, and may differ in different repeat units. The term "alkyl" in the context of the overall invention generally includes substituents from the group of n-alkyl such as methyl, ethyl or propyl, branched alkyl and/or cycloalkyl. The term "aryl" in the context of the overall invention generally includes substituents from the group of monocyclic carbo- or heteroaryl substituents such as phenyl and/or polycyclic carbo- or heteroaryl substituents which may optionally be substituted by further alkyl groups and/or heteroatoms such as nitrogen, oxygen, silicon, sulfur or phosphorus. The $R^1$, $R^2$, $R^3$ and $R^4$ radicals may be joined to one another within a repeat unit such that they form cyclic structures, for example a cycloalkyl radical incorporated into the polymer chain via two adjacent carbon atoms.

The DMC catalyst is preferably activated in the presence of the polymeric formaldehyde starter compound. The starter compound and the DMC catalyst may optionally be suspended in a suspension medium. It is likewise also possible to use a further liquid starter compound ("co-starter") in the mixture, in which case the DMC catalyst and the polymeric formaldehyde starter compound are suspended therein.

According to the invention, the DMC catalyst is activated at an activation temperature Tact in the range from 20° C. to 120° C., preferably at 30° C. to 120° C., more preferably at 40° C. to 100° C. and most preferably at 60° C. to 100° C.

"Activation" of the DMC catalyst is understood to mean a step in which a portion of alkylene oxide is added to the DMC catalyst suspension at the specific activation temperature and then the addition of the alkylene oxide is stopped, with observation of evolution of heat that can lead to a temperature spike ("hotspot") owing to a subsequent exothermic chemical reaction, and of a pressure drop in the reactor owing to the conversion of alkylene oxide.

DMC catalysts suitable for the process for preparing component B for use in the homopolymerization of alkylene oxides are known in principle from the prior art (see, for example, U.S. Pat. Nos. 3,404,109, 3,829,505, 3,941,849 and 5,158,922). DMC catalysts, described, for example, in U.S. Pat. No. 5,470,813, EP-A 700 949, EP-A 743 093, EP-A 761 708, WO 97/40086, WO 98/16310 and WO 00/47649, have very high activity in the polymerization of alkylene oxides and in some cases the copolymerization of alkylene oxides with suitable comonomers, and they enable the preparation of polyoxymethylene copolymers at very low catalyst concentrations, so that there is generally no longer any need to separate the catalyst from the finished product. A typical example is that of the highly active DMC catalysts described in EP-A 700 949 which contain not only a double metal cyanide compound (e.g. zinc hexacyanocobaltate(III)) and an organic complex ligand (e.g. tert-butanol) but also a polyether having a number-average molecular weight greater than 500 g/mol. Preference is given to synthesizing components A1 using DMC catalysts that have been prepared with addition of a base, preferably KOH. Such a particularly preferred DMC catalyst is one according to example 6 of WO 01/80994 A1. Preference is given to using a DMC catalyst comprising zinc hexacyanocobaltate, tert-butanol and polypropylene glycol having a number-average molecular weight of about 1000 g/mol for synthesis of component B.

The concentration of DMC catalyst used is typically 10 to 10 000 ppm, more preferably 20 to 5000 ppm and most preferably 50 to 2000 ppm, based on the mass of the polyoxymethylene block copolymer to be prepared. According to the profile of requirements for downstream use, the DMC catalyst can be left in the product or (partly) removed. The (partial) removal of the DMC catalyst can be effected, for example, by treatment with adsorbents and/or filtration. Processes for removing DMC catalysts are described, for example, in U.S. Pat. No. 4,987,271, DE-A 3132258, EP-A 0 406 440, U.S. Pat. Nos. 5,391,722, 5,099,075, US-A 4,721,818, U.S. Pat. No. 4,877,906 and EP-A 0 385 619. It is preferable according to the invention when component B, and optionally also component C, contain a residual content of DMC catalyst(s), such that component B and component C contain a total content of DMC catalyst(s) of 10 to 5000 ppm, preferably of 10 to 3000 ppm, in each case based on the total amount of component B and C.

In a preferred embodiment of the process according to the invention, at least component B has been prepared in the presence of a double metal cyanide catalyst, and component B still contains at least some of this double metal cyanide catalyst, wherein the content of double metal cyanide catalyst based on the total amount of components B and C is 10 to 5000 ppm, preferably 10 to 3000 ppm, particularly preferably 10 to 2500 ppm, and the content of double metal cyanide catalyst is determined using the amount of metal content from the double metal cyanide catalyst determined according to DIN ISO 17025 (August 2005). The amount of metal content from the DMC catalyst may be determined either for components B and C in total or alternatively for each of the two components separately. The figures as to the metal content from the DMC catalyst and the molecular weight of the DMC catalyst can then be used to calculate the amount of catalyst. It should be taken into account here that double metal cyanide catalysts may contain different metals in respectively different amounts.

Epoxides (alkylene oxides) used for the preparation of the polyoxymethylene-polyoxyalkylene block copolymers are preferably compounds of the general formula (I):

(I)

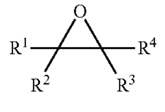

where $R^1$, $R^2$, $R^3$ and $R^4$ are independently hydrogen or an alkyl or aryl radical optionally containing additional heteroatoms, such as nitrogen, oxygen, silicon, sulfur or phosphorus, and may optionally be joined to one another so as to form cyclic structures, for example a cycloalkylene oxide.

Preference is given to using those alkylene oxides suitable for polymerization in the presence of a DMC catalyst. If different alkylene oxides are used, these may be metered in either as a mixture or consecutively. In the case of the latter metered addition, the polyether chains of the polyoxymethylene-polyoxyalkylene block copolymer obtained in this way may in turn likewise have a block structure.

In general, it is possible to use alkylene oxides (epoxides) having 2-24 carbon atoms. The alkylene oxides having 2-24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, C1-C24 esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate, and epoxy-functional alkoxysilanes, for example 3-glycidyloxypropyltrimethoxysilane, 3-glycidyloxypropyltriethoxysilane, 3-glycidyloxypropyl-tripropoxysilane, 3-glycidyloxypropylmethyldimethoxysilane, 3-glycidyloxypropylethyldiethoxysilane, 3-glycidyloxypropyltriisopropoxysilane. The epoxide of the general formula (I) is preferably a terminal epoxide where $R^1$, $R^2$ and $R^3$ are hydrogen and $R^4$ may be hydrogen, an alkyl or aryl radical optionally containing additional heteroatoms such as nitrogen, oxygen, silicon, sulfur or phosphorus and may differ in different repeat units. Alkylene oxides used with preference are ethylene oxide and/or propylene oxide, especially propylene oxide.

The process according to the invention is preferably performed such that the activation of the catalyst (step i) is followed by a polymerization step (ii) with metered addition of one or more alkylene oxides.

In a further embodiment of the process according to the invention, the polymerization of the alkylene oxides in step ii) is effected in the presence of a further comonomer. Employable further comonomers include for example any oxygen-containing cyclic compounds, especially cyclic ethers, for example oxetane, THF, dioxane or cyclic acetals, for example 1,3-dioxolane or 1,3-dioxepane, cyclic esters, for example γ-butyrolactone, γ-valerolactone, ε-caprolactone, or cyclic acid anhydrides, for example maleic anhydride, glutaric anhydride or phthalic anhydride, and carbon dioxide. Preference is given to using carbon dioxide as a comonomer.

Further comonomers may be metered into the reaction in pure form, in solution or as a mixture with one or more alkylene oxides. The metered addition of further comonomers may likewise be effected simultaneously with or subsequently to the metered addition of the alkylene oxides.

A preferred embodiment of the process of the invention comprises not only addition of the alkylene oxide(s) onto the polymeric formaldehyde starter compound but also addition of carbon dioxide ($CO_2$) as a further comonomer. This makes it possible to prepare polyoxymethylene-polyoxyalkylene carbonate copolymers. Compared to existing products (for example polyether polyols in the polyurethane sector or polyoxymethylene (co-)polymers in the POM sector), these additionally include $CO_2$ as an inexpensive and environmentally friendly comonomer. Since $CO_2$ is, inter alia, a waste product from energy generation from fossil raw materials and is being sent here to chemical reutilization, the incorporation of $CO_2$ into the polymer structures provides not only economic but also environmental benefits (favorable $CO_2$ balance of the product polymers, etc.).

Polyoxymethylene-polyoxyalkylene carbonate block copolymers in the context of the invention refer to polymeric compounds containing at least one polyoxymethylene block and at least one polyoxyalkylene carbonate block. Polyoxymethylene-polyoxyalkylene carbonate block copolymers are of particular interest as feedstocks in the polyurethane sector and for applications in the polyoxymethylene (POM) sector. By altering the $CO_2$ content, the physical properties can be matched to the particular use, thus making it possible to develop new fields of application for these block copolymers. The process according to the invention especially makes it possible to provide polyoxymethylene-polyoxyalkylene carbonate copolymers, wherein a high content of incorporated $CO_2$ is achieved and the products have a comparatively low polydispersity and contain a very low level of by-products and decomposition products of the polymeric formaldehyde.

Component C comprises component Ci and optionally employable component Cii.

Component Ci comprises at least one amino-containing polyether based on propylene oxide having an OH number in the range from 40 to 80 mg KOH/g, preferably 45 to 75 and particularly preferably 50 to 70, an OH functionality of 4.0 and an amine content in the range from 0.50 to 1.00, preferably 0.56 to 0.94 and particularly preferably 0.62% to 0.88% by weight. Contemplated starter molecules for the starting compounds Ci include for example diamines, for example ethylenediamine, hexamethylenediamine, isophoronediamine, toluenediamine and 4,4'-diaminodicyclohexylmethane. The composition for preparing the isocyanate-terminated prepolymer preferably contains 10% by weight to 30% by weight of component Ci based on the sum of all components in the composition.

Component Cii comprises at least one amino-containing polyether based on ethylene oxide, propylene oxide or a mixture of ethylene oxide and propylene oxide having an $NH_2$-functionality of 2 or 3, with the exception of amino-containing polyethers of component Ci. The amino-containing polyethers of component Cii preferably contain no OH functions (OH functionality=0).

Preferred amino-containing polyethers of this type conform to the following general formulae

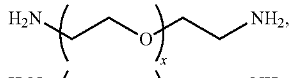

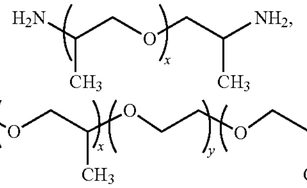

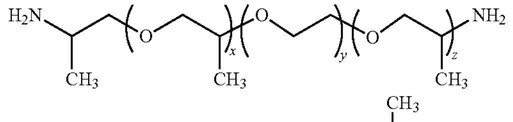

and

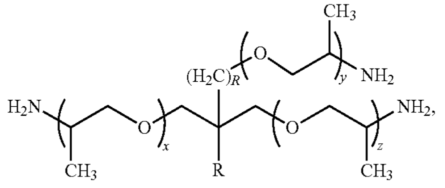

where x is a number from 0 to 10, y is a number from 0 to 40 and z is a number from 0 to 10, EO is ethylene oxide and PO is propylene oxide. Examples of such amino-container polyethers include the products available from Huntsman Corporation under the name JEFFAMINE®. It is preferable to employ amino-containing polyethers of the JEFFAMINE® D, JEFFAMINE® ED, JEFFAMINE® T and JEFFAMINE® XTJ series.

The amino-containing polyethers of the JEFFAMINE® D series are amine-terminated polypropylene glycols (PPG) of general formula

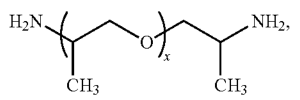

where x is a number from 2 to 8.

The amino-containing polyethers of the JEFFAMINE® ED series have a predominantly polyethylene glycol (PEG)-based backbone and conform to the general formula

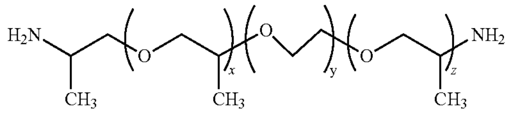

where y is a number from 5 to 40 and the sum of x+z is a number from 3 to 8.

The amino-containing polyethers of the JEFFAMINE® T series are amine-terminated polypropylene glycols (PEG) of general formula

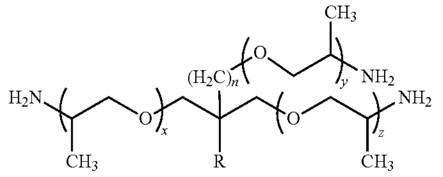

where R is hydrogen, $CH_3$ or $C_2H_5$, n is a number 0, 1 or 2 and x+y+z=a number from 3 to 100.

The amino-containing polyethers of the JEFFAMINE® XTJ series are slower amines having a structure analogous to the amines of the D and T. The amino-containing polyethers of the JEFFAMINE® XTJ series are primary amines prepared by amination of epoxy-terminated polyethers. The reaction affords primary amines having terminal groups of formula

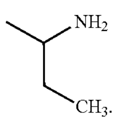

Preferred amino-containing polyethers from the JEFFAMINE® product line are JEFFAMINE® D and JEFFAMINE® T.

The composition for preparing the isocyanate-terminated prepolymer preferably contains 0% to 15% by weight of component Cii based on the sum of all components in the composition.

The compounds of component C may be prepared by DMC catalysis or else by other known preparation routes. If a DMC catalyst is employed essentially the same disclosures as specified hereinabove for component B are applicable.

Component D optionally employable in the process according to the invention is selected from auxiliaries, wherein the abilities are preferably compounds having an antioxidant effect, so-called antioxidants (component D1). Suitable antioxidants are preferably sterically hindered phenols, which may be selected preferably from the group consisting of 2,6-di-tert-butyl-4-methylphenol (ionol), pentaerythritol tetrakis(3-(3,5-di-tert-butyl-4-hydroxyphenyl) propionate), octadecyl 3-(3,5-di-tert-butyl-4-hydroxyphenyl)propionate, triethylene glycol bis(3-tert-butyl-4-hydroxy-5-methylphenyl)propionate, 2,2'-thiobis(4-methyl-6-tert-butylphenol) and 2,2'-thiodiethyl bis[3-(3,5-di-tert-butyl-4-hydroxyphenyl)propionate]. These may be used either individually or in any desired combinations with one another as required. The composition for preparing the isocyanate-terminated prepolymer preferably contains 0.10% by weight to 0.20% by weight of component D1 based on the sum of all components in the composition.

Employable auxiliaries also included protic acids for example (Component D2). These are inorganic acids, carboxylic acids, halogenated carboxylic acids, dicarboxylic acids, hydroxycarboxylic acids, sulfonic acids, phosphoric acid, phosphoric acid derivatives, paratoluenesulfonic acids or an ammonium salt. Component D2 is preferably selected from the group consisting of benzoyl chloride, o-chlorobenzoic acid, ammonium nitrate, ammonium chloride, boron trichloride, boron trifluoride, bromoacetic acid, chloroacetic acid, trichloroacetic acid, 2-chloropropionic acid, citric acid, diethyl malonate, diphenylacetic acid, formic acid, cinnamic acid, salicylic acid, naphthoic acid, oxalic acid, fumaric acid, maleic acid, citraconic acid, adipic acid, glutaric acid, succinic acid, malonic acid, phthalic acid, isophthaloyl chloride, terephthaloyl chloride, malic acid, tartaric acid, uric acid (2,6,8-trihydroxypurine), picric acid (2,4,6-trinitrophenol), phosphoric acid, diphosphoric acid, dibutyl phosphate, sulfuric acid, hydrochloric acid, methanesulfonic acid and p-toluenesulfonyl chloride. Dibutyl phosphate, hydrochloric acid or 2-chloropropionic acid is particularly preferred. The composition for preparing the isocyanate-terminated prepolymer contains 0% to 0.50% by weight, preferably 0% to 0.30% by weight, particularly preferably 0% to 0.20% by weight, of component D2 based on the sum of all components in the composition. The preparation of the isocyanate-terminated prepolymer according to the invention is most preferably carried out without addition of a protic acid D2. The preparation of the isocyanate-terminated prepolymers is advantageously carried out by reaction of the isocyanate components A with the polyol components B and C, optionally auxiliary D. It is preferable when the isocyanate component A is initially charged in a molar excess, typically in a reaction vessel, and the polyol components B and C are metered in either as a mixture or consecutively at temperatures in the range from 20° C. to 160° C., preferably 40° C. 140° C. Any exothermicity which may occur is advantageously compensated by cooling in such a way that the reaction between the isocyanate groups of the isocyanate component and the hydroxyl groups of the hydroxyl components proceeds at a constant temperature. The reaction is complete when the desired isocyanate contents/viscosities of the isocyanate-terminated prepolymers according to the invention have been achieved.

If monomeric diisocyanates are used, any residual amounts of these isocyanates must be removed after the urethane reaction, for example by distillation or extraction, to obtain products having residual monomer contents of <1% by weight, preferably <0.5% by weight and particularly preferably <0.3% by weight. If polyisocyanates are used to prepare the isocyanate-terminated prepolymers according to the invention, a removal of excess residual monomers after the urethane reaction is no longer necessary because polyisocyanates already have residual monomer contents in the required range of <0.5% by weight.

The reaction components are preferably employed in ratios such that the above-described properties of the isocyanate-terminated prepolymers, in particular the viscosity, the isocyanate content and the functionality, are achieved.

The present invention further provides isocyanate-terminated prepolymers obtainable by the process described hereinabove, the use of these prepolymers as an isocyanate component in 1- and 2-component paint, adhesive and sealant systems, and the 1- and 2-component paint, adhesive and sealant systems themselves.

The resulting isocyanate-terminated prepolymers according to the invention are suitable for use as one-component moisture-curable coating compositions, adhesives and sealants. The isocyanate-terminated prepolymers according to the invention are further suitable for use in two-component coating compositions, adhesives and sealants. To this end, commercially available polyols and/or polyamines (functionality ≥2 in each case) are used as coreactants. Such polyols and/or polyamines have been described previously. Further polyols that may be employed include solvent-free and solvent-containing polyacrylate polyols such as are obtainable for example from Viverso GmbH, Bitterfeld under the trade name Desmophen® A. It is also possible to use aspartic esters as coreactants for the isocyanate-terminated prepolymers according to the invention. These special type ofpolyamines comprises products having reduced reactivity of the secondary amino groups. This makes it possible to formulate two-component systems having an appropriate pot life in the range from 10 to 60 minutes which is otherwise impossible on account of the high reactivity of customary compounds comprising primary or secondary amino groups. Examples of suitable aspartic acid esters include for example Desmophen® NH 1220, Desmophen® NH 1420, Desmophen® NH 1520 and Desmophen® NH 1521 from Covestro Deutschland AG.

The selection of the suitable polyols and/or polyamines and of the isocyanate-functional prepolymers according to the invention is generally carried out in such a way that the product properties optimal for the particular application are achieved.

The present invention thus further provides paint, adhesive or sealant systems, wherein these are 1-component moisture-curable systems, and paint, adhesive or sealant systems, wherein these are 2-component systems which further comprise at least one isocyanate-reactive component in addition to the isocyanate-terminated prepolymer according to the invention. An isocyanate-reactive component is to be understood as meaning a compound which bears at least one isocyanate-reactive group, for example di- and polyols and di- and polyamines.

EXAMPLES

Materials

- Isocyanate 1: aromatic polyisocyanate based on diphenylmethane diisocyanate (MDI) having an NCO content of 31.5% (31.8), a content of 2,2'-MDI of 2.3% (0.1), a content of 2,4'-MDI of 12.6% (12.7) and a content of 4,4'-MDI of 42.4% (54.4)) as well as a viscosity of 90 (100) mPas at 25° C.
- Polyol 1: polyoxymethylene-polypropylene oxide block copolymer having an OH number of 112 mg KOH/g, prepared under double metal cyanide catalysis, the double metal cyanide catalyst having been prepared according to example 6 of WO 01/80994 A1
- Polyol 2: polyoxymethylene-polypropylene oxide block copolymer having an OH number of 56 mg KOH/g, prepared under double metal cyanide catalysis, the double metal cyanide catalyst having been prepared according to example 6 of WO 01/80994 A1
- Polyol 3: polyoxymethylene-polypropylene oxide block copolymer having an OH number of 18 mg KOH/g, prepared under double metal cyanide catalysis, the double metal cyanide catalyst having been prepared according to example 6 of WO 01/80994 A1
- Polyol 4: polypropylene oxide polyether based on 1,2-propylene glycol having an OH number of 112 mg KOH/g
- Polyol 5: polypropylene oxide polyether based on 1,2-propylene glycol having an OH number of 56 mg KOH/g
- Polyol 6: polypropylene oxide polyether based on 1,2-propylene glycol having an OH number of 14 mg KOH/g
- Polyol 7: polypropylene oxide polyether based on 1,2-diaminoethane having an OH number of 60 mg KOH/g and an amine content of 0.7% by weight Methods OH numbers were determined titrimetrically on the basis of DIN 53240-2:2007-11.

Amine content was determined titrimetrically according to DIN EN ISO 9702:1998.

NCO contents were determined titrimetrically according to DIN EN ISO 11909:2007-05.

All viscosity measurements were recorded with a Physica MCR 51 rheometer from Anton Paar Germany GmbH (DE) in accordance with DIN EN ISO 3219:1994-10 at a shear rate of 250 s-1.

The film forming time (FFT, dry-hard time) and film drying times (FDT, set-to-touch time) were determined in a linear drying recorder according to ASTM D 5895:2013-06.

The tensile shear strength of a gapless beechwood/beechwood adhesive bond subjected to tensile forces parallel to the bonded surface was measured according to DIN EN 205:2016-12.

Syntheses

Example 1

A mixture of 175.0 g of polyoxymethylene-polypropylene oxide block copolymer having an OH number of 112 mg KOH/g prepared under double metal cyanide catalysis (polyol 1) and 214.5 g of polypropylene oxide polyether based on 1,2-diaminoethane having OH number of 60 mg KOH/g and an amine content of 0.7% by weight (polyol 7) is placed in a 1 liter flat flange vessel and stirred at 120° C. under a vacuum of 20 mbar for 1 hour. This was followed by cooling to 55° C. The obtained polyol mixture is metered over about 30 minutes into 571.0 g of an aromatic polyisocyanate based on diphenylmethane diisocyanate (MDI) having an NCO content of 31.5%, a content of 2,2'-MDI of 2.3%, a content of 2,4'-MDI of 12.6% and a content of 4,4'-MDI of 42.4% as well as a viscosity of 90 mPas at 25° C. (isocyanate 1). The mixture is then heated to 60° C., utilizing any exothermic reaction that may occur. The mixture is stirred at 60° C. until the isocyanate content is constant. This affords a brownish-colored polyisocyanate mixture having an NCO content of 15.2% by weight, a viscosity of 35 600 mPas (23° C.) and an average isocyanate functionality of 2.7.

Examples 2 to 3

The process described in example 1 was used to prepare further polyisocyanates using the polyols summarized in table 1. The resulting characteristics are likewise summarized in table 1.

Comparative Example 4 to 6

Further polyisocyanates were prepared by the process described in example 1 using the polyols summarized in table 1. The resulting characteristics are likewise summarized in table 1.

Performance Tests

Testing Reactivity as Reactive Adhesive

To compare reactivity the film forming time (FFT, dry-hard time) and film drying times (FDT, set-to-touch time) were measured in a linear drying recorder according to ASTM D 5895:2013 and viscosity was measured at 25° C. (on the basis of DIN EN ISO 3219:1994-10). The wet film thickness of the reactive adhesive was 250 μm. The storage stability at 70° C. was also measured in the form of the viscosity increase over time. The polyisocyanate mixture is considered storage-stable if the viscosity has less than doubled over 14 days of storage at 70° C.

The inventive polyisocyanate mixture according to example 1 has a higher viscosity and comparable storage stability relative to example 4 (comparative). However, the reactivity of the inventive polyisocyanate mixture of example 1, which is reflected in shorter film formation and film drying times, is markedly higher than the reactivity of the comparative example.

This effect is even more marked in example 2. In contrast to comparative example 5 the reactivity of the inventive polyisocyanate is significantly higher than the reactivity of the comparative example.

The inventive polyisocyanate example 3 shows not only elevated reaction of the three recited examples but also the lowest viscosity.

Testing of Tensile Shear Strength as a Reactive Adhesive

To compare adhesive effect the tensile shear strength of a gapless beechwood/beechwood adhesive bond subjected to tensile forces parallel to the bonded surface was measured according to DIN EN 205:2016. Tensile shear strength was tested according to the time intervals summarized in the table below.

After 60 min the inventive polyisocyanate mixture according to example 1 experiences a higher force compared to example 4 (comparison) until the specimen breaks. This is also exhibited by examples 2 and 3, which experience a higher force than comparative examples 5 and 6 until the specimen breaks.

As reflected in the higher tensile strengths the adhesive strength of the inventive polyisocyanate mixture of example 1 is markedly higher than the adhesive strength of the comparative example.

TABLE 1

Summary of compositions and characteristics of the examples.

| | Inventive Example | | | Comparative Example | | |
|---|---|---|---|---|---|---|
| Mixture | 1 | 2 | 3 | 4 | 5 | 6 |
| Polyisocyanate [g] | 571.0 | 571.0 | 571.0 | 571.0 | 571.0 | 571.0 |
| Polyol 1 [g] | 175.0 | — | — | — | — | — |
| Polyol 2 [g] | — | 214.0 | — | — | — | — |
| Polyol 3 [g] | — | — | 250.0 | — | — | — |
| Polyol 4 [g] | — | — | — | 175.0 | — | — |
| Polyol 5 [g] | — | — | — | — | 214.0 | — |
| Polyol 6 [g] | — | — | — | — | — | 250.0 |
| Polyol 7 [g] | 214.5 | 214.5 | 214.5 | 214.5 | 214.5 | 214.5 |
| NCO content: [% by wt.] | 15.3 | 15.0 | 15.4 | 15.2 | 15.0 | 15.4 |
| Viscosity [mPas (23° C.)] | 41800 | 22800 | 21000 | 35600 | 19400 | 14700 |
| Isocyanate functionality | 2.7 | 2.8 | 2.8 | 2.8 | 2.8 | 2.8 |
| FFT [min] | 30 | 25 | 30 | 35 | 40 | 30 |
| FDT [min] | 90 | 80 | 80 | 95 | 95 | 85 |
| Storage stability (over 14 d at 70° C.) | yes | yes | yes | yes | yes | yes |
| Tensile shear strength after 0.5 h [N/mm$^2$] | 0.0 | 0.0 | 0.0 | 0.0 | 0.0 | 0.0 |
| Tensile shear strength after 1 h [N/mm$^2$] | 6.8 | 1.9 | 2.0 | 3.9 | 0.6 | 1.3 |

The invention claimed is:

1. A process for preparing an isocyanate-terminated prepolymer comprising reacting:

A) at least one polyisocyanate, wherein component A) has an NCO content according to DIN EN ISO 11909:2007-05 of 15% to 60% by weight;

B) at least one polyoxymethylene-polyoxyalkylene block copolymer having a hydroxyl number according to DIN 53240-2:2007-11 of 15 mg KOH/g to 200 mg KOH/g;

C)i) at least one amino-containing polyether based on propylene oxide having a hydroxyl number according to DIN 53240-2:2007-11 of 40 to 80 mg KOH/g, an OH functionality of 4.0 and an amine content according to DIN EN 9702:1998 in the range from 0.5% to 1.0% by weight;

C)ii) optionally at least one amino-containing polyether based on based on ethylene oxide, propylene oxide or a mixture of ethylene oxide and propylene oxide having an $NH_2$-functionality of 2 or 3, which is different from C) i) the at least one amino-containing polyether; and D) optionally auxiliaries (D2) containing protic acids and/or auxiliaries (D1) which are not protic acids.

2. The process of claim 1, wherein component B) consists of a polyoxymethylene-polypropylene oxide block copolymer or a polyoxymethylene-polyoxyalkylene carbonate block copolymer.

3. The process of claim 1, wherein at least component B) has been prepared in the presence of a double metal cyanide catalyst, and component B) contains at least some of the double metal cyanide catalyst, wherein the content of double metal cyanide catalyst based on the total amount of components B) and C) is 10 to 5000 ppm determined using the amount of metal content from the double metal cyanide catalyst determined according to DIN ISO 17025, August 2025.

4. The process of claim 1, wherein the at least one polyoxymethylene-polyoxyalkylene block copolymer of component B) has a hydroxyl number according to DIN 53240-2:2007-11 of 15 mg KOH/g to 150 mg KOH/g.

5. The process of claim 1, wherein the at least one amino-containing polyether of component C)i) has a hydroxyl number according to DIN 53240-2:2007-11 of 45 to 75 mg KOH/g.

6. The process of claim 1, wherein the at least one amino-containing polyether of component C)i) has an amine content according to DIN EN 9702:1998 of 0.56% to 0.94% by weight.

7. The process of claim 1, wherein component A) comprises at least one aromatic polyisocyanate.

8. The process of claim 1, wherein the isocyanate-terminated prepolymer is a reaction product of a composition comprising:

50% to 70% by weight of component A),

15% to 30% by weight of component B),

10% to 30% by weight of component C)i),

0% to 15% by weight of component C)ii), 0.10% to 0.20% by weight of component D1), and 0% to 0.50% by weight of component D2), wherein all % by weight values are based on the sum of all components of the composition.

9. An isocyanate-terminated prepolymer obtained by the process of claim 1.

10. The process of claim 2, wherein the polyoxymethylene-polypropylene oxide block copolymer and/or the polyoxymethylene-polyoxyalkylene carbonate block copolymer comprises two terminal polyoxyalkylene blocks.

11. The process of claim 7, wherein the at least one aromatic polyisocyanate comprises 1,5-naphthalene diisocyanate, diisocyanatodiphenylmethane, poly(methylene phenyl isocyanate), diisocyanatomethylbenzene, or a mixture thereof.

12. An isocyanate-terminated prepolymer comprising a reaction product of a composition comprising:

A) at least one polyisocyanate, wherein component A) has an NCO content according to DIN EN ISO 11909:2007-05 of 15% to 60% by weight;

B) at least one polyoxymethylene-polyoxyalkylene block copolymer having a hydroxyl number according to DIN 53240-2:2007-11 of 15 mg KOH/g to 200 mg KOH/g;

C)i) at least one amino-containing polyether based on propylene oxide having a hydroxyl number according to DIN 53240-2:2007-11 of 40 to 80 mg KOH/g, an OH functionality of 4.0 and an amine content according to DIN EN 9702:1998 in the range from 0.5% to 1.0% by weight;

C)ii) optionally at least one amino-containing polyether based on based on ethylene oxide, propylene oxide or a mixture of ethylene oxide and propylene oxide having an $NH_2$-functionality of 2 or 3, with the exception of amino-containing polyethers of component C)i); and D) optionally auxiliaries containing protic acids (D2) and/or auxiliaries which are not protic acids of D2 (D1).

13. The isocyanate-terminated prepolymer of claim 12, wherein the composition comprises:

50% to 70% by weight of component A),

15% to 30% by weight of component B),

10% to 30% by weight of component C)i),

0% to 15% by weight of component C)ii), 0.10% to 0.20% by weight of component D1), and 0% to 0.50% by weight of component D2), wherein all % by weight values are based on the sum of all components of the composition.

14. A paint, adhesive or sealant system comprising the isocyanate-terminated prepolymer of claim 12.

15. The paint, adhesive or sealant system of claim 14, wherein the paint, adhesive or sealant system is a 1-component moisture-curable system comprising no isocyanate-reactive components in addition to components C)i) and C)ii).

16. The paint, adhesive or sealant system of claim 14, wherein the paint, adhesive or sealant system is a 2-component moisture-curable system comprising at least one isocyanate-reactive component in addition to components C)i) and C)ii).

17. A substrate coated or bonded with the paint, adhesive or sealant system of claim 14.

* * * * *